2,744,931
ANHYDROCHLORTETRACYCLINE

Robert Broschard, Pearl River, and George Krupka, Nanuet, N. Y., assignors to American Cyanamid Company, New York, N. Y., a corporation of Maine No Drawing. Application October 11, 1952, Serial No. 314,408

3 Claims. (Cl. 260—559)

This invention relates to anhydrochlortetracycline, salts thereof and methods of preparing the same.

Anhydrochlortetracycline is an amine base which is believed to be best represented by the following structural formula:

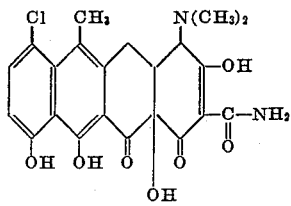

Anhydrochlortetracycline forms salts with acids in a manner typical of amine bases and can be isolated in the form of its acid addition salts if desired. For instance, anhydrochlortetracycline can be isolated in the form of its salts with hydrochloric acid, hydrobromic acid, sulfuric acid, phosphoric acid, acetic acid and picric acid.

Anhydrochlortetracycline and its acid addition salts are useful in many fields of chemistry and may be employed, for instance, as bactericides or in compositions prepared for use as bactericides. It has been found that anhydrochlortetracycline and its addition salts show a bactericidal effect against an extraordinary large number of both gram-positive and gram-negative bacteria.

While it is not intended that this invention be limited to anhydrochlortetracycline and its acid addition salts when prepared by any one particular procedure, it has been found that these new compounds can be prepared from chlortetracycline or salts thereof by a process comprising dehydration and it is intended that this new method constitute a part of the present invention.

According to the new process of this invention, chlortetracycline or a salt thereof is treated with a strong mineral acid as illustrated by hydrochloric, hydrobromic, phosphoric, sulfuric or other mineral acids free of strong oxidizing and strong reducing properties. The preferred mineral acid is hydrochloric which can be employed in any concentration above about .05 to 1 normal although concentrated hydrochloric acid has been found to give the most satisfactory results. The strong mineral acid causes the chlortetracycline compound to eliminate a molecule of water to form a second aromatic ring as can be illustrated by the following equation:

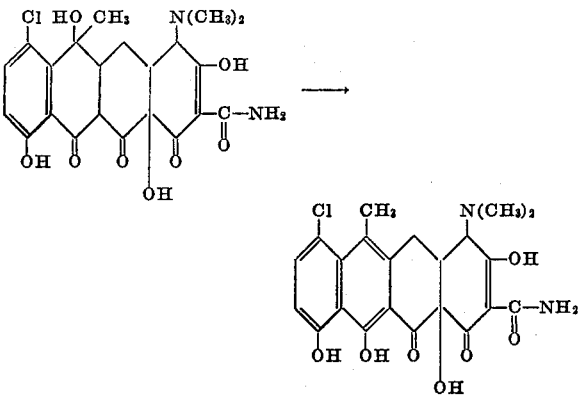

The time of reaction depends upon a number of factors including the particular mineral acid employed, the concentration of the mineral acid, and the temperature. As a general rule, one to two hours at room temperature or about ten minutes at steam bath temperature will be found to be sufficient, but with more dilute acids, longer times should be allowed. As indicated above, the reaction can be conveniently performed at room temperature or even lower, for instance 10° C., but for reasons of convenience, higher temperatures, for instance 60° C. to 80° C., are preferred. Ordinarily, the reaction should not be conducted at temperatures above about 100° C. since some decomposition of materials will be experienced at higher temperatures.

The invention will be more particularly illustrated by the following specific example:

Example

Chlortetracycline hydrochloride, 15 g., was dissolved in 50 ml. of concentrated hydrochloric acid and heated on a steam bath for ten minutes. Then 150 ml. of water was added and a heavy precipitate separated. This crude hydrochloride of anhydrochlortetracycline was centrifuged from the solution and dissolved in 1.5 liters of water. The pH of this aqueous solution was adjusted to about 5 with 6 N NaOH and the solution was extracted six times with equal volumes of ethyl ether. The combined ether extracts were dried by freezing out the water, and then the ether solution was concentrated to a small volume. Long orange needles formed which were collected by filtration, yielding 10.5 g. of anhydrochlortetracycline having a melting point of about 220° C.–235° C. with decomposition, $[\alpha]_D^{25} + 16°$ (in Cellosolve).

In place of the hydrochloric acid employed in the above example, an equivalent quantity of other minerals, for instance hydrobromic acid, can be substituted.

We claim:

1. Compounds selected from the group consisting of anhydrochlortetracycline of the formula

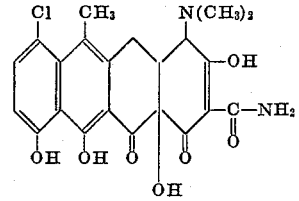

and the hydrochloric, hydrobromic, sulfuric, phosphoric, acetic and picric acid addition salts thereof.

2. The new compound anhydrochlortetracycline of the formula

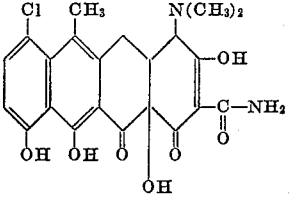

3. The new compound anhydrochlortetracycline hydrochloride of the formula

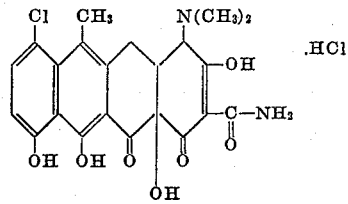

(References on following page)

References Cited in the file of this patent

UNITED STATES PATENTS

| | | |
|---|---|---|
| 2,482,055 | Duggar | Sept. 13, 1949 |
| 2,516,080 | Sobin et al. | July 18, 1950 |

OTHER REFERENCES

Dunitz: JACS, vol. 74, Feb. 20, 1952, p. 1108.
Dunitz et al.: JACS, vol. 72 (1950), pp. 4276-7.
Hochstein et al.: JACS, vol. 74, July 20, 1952, pp. 3707-9 (received June 25, 1952).
Waller et al.: JACS, vol. 74 (1952), pp. 4981-2.
Broschard et al.: "Science," vol. 109 (1949), pp. 199-200.